United States Patent
Peyrotte et al.

(10) Patent No.: US 11,496,866 B2
(45) Date of Patent: Nov. 8, 2022

(54) SATELLITE LOCATING AND COMMUNICATION METHOD AND SYSTEM FOR A FIXED RADIO TERMINAL ON THE GROUND USING AT LEAST ONE NON-GEOSTATIONARY SATELLITE

(71) Applicant: THALES, Courbevoie (FR)

(72) Inventors: Christian Peyrotte, Toulouse (FR); Shadi Khureim Castiglioni, Toulouse (FR); Nicolas Van Wambeke, Toulouse (FR)

(73) Assignee: THALES, Courbevoie (FR)

( * ) Notice: Subject to any disclaimer, the term of this patent is extended or adjusted under 35 U.S.C. 154(b) by 149 days.

(21) Appl. No.: 17/094,751

(22) Filed: Nov. 10, 2020

(65) Prior Publication Data
US 2021/0152978 A1    May 20, 2021

(30) Foreign Application Priority Data

Nov. 14, 2019  (FR) ...................................... 1912692

(51) Int. Cl.
*H04W 4/029* (2018.01)
*G01S 19/02* (2010.01)

(52) U.S. Cl.
CPC ............. *H04W 4/029* (2018.02); *G01S 19/02* (2013.01)

(58) Field of Classification Search
CPC ........... H04W 4/029; G01S 19/02; G01S 5/02
See application file for complete search history.

(56) References Cited

U.S. PATENT DOCUMENTS

| | | | | |
|---|---|---|---|---|
| 5,764,188 | A * | 6/1998 | Ghosh ........................ | G01S 5/14 455/456.1 |
| 8,971,932 | B2 * | 3/2015 | Mapes .................. | H04W 4/029 455/457 |
| 9,042,917 | B2 * | 5/2015 | Edge ...................... | H04W 64/00 455/457 |
| 10,126,405 | B2 | 11/2018 | Thevenet et al. | |
| 2012/0184296 | A1 * | 7/2012 | Milosiu ................ | H04B 17/318 455/456.1 |

(Continued)

OTHER PUBLICATIONS

Klemann & Kreutzfeldt Gmbh, "LEOSAR", Dec. 31, 2010.
(Continued)

*Primary Examiner* — Qutbuddin Ghulamali
(74) *Attorney, Agent, or Firm* — BakerHostetler (57) ABSTRACT

A locating and communication method for a radio terminal by means of a satellite locating and communication system, which implements a first step, in the course of which the radio terminal transmits to a non-geostationary satellite a repeating sequence a predetermined number of times N for the same data packet, which is time-shifted by the same predetermined time shift Δτ each time is provided. Subsequently, a satellite access and processing ground station determines the location of the radio terminal from the data packets with access, which are extracted from a listening signal digitized and dated by the satellite and from the same detected sequence associated with said radio terminal, and from the ephemerides of the satellite by using a technique for measuring angle or angles of arrival by means of sequenced interferometry associated with a technique for measuring Doppler drift or drifts.

12 Claims, 5 Drawing Sheets

(56) References Cited

U.S. PATENT DOCUMENTS

| | | | |
|---|---|---|---|
| 2013/0203437 A1* | 8/2013 | Whelan | G01S 19/05 |
| | | | 455/12.1 |
| 2019/0004144 A1* | 1/2019 | O'Shea | G01S 19/426 |
| 2019/0204404 A1* | 7/2019 | Razon | G01S 5/02213 |
| 2019/0324110 A1* | 10/2019 | O'Shea | G01S 5/0036 |

OTHER PUBLICATIONS

Cakaj, et al., "Simulation of Local User Terminal Implementation for Low Earth Orbiting (LEO) Search and Rescue Satellites", 2010 Second International Conference on Advances in Satellite and Space Communications, pp. 140-145, Jun. 13, 2010.

* cited by examiner

SATELLITE LOCATING AND COMMUNICATION METHOD AND SYSTEM FOR A FIXED RADIO TERMINAL ON THE GROUND USING AT LEAST ONE NON-GEOSTATIONARY SATELLITE

CROSS-REFERENCE TO RELATED APPLICATIONS

This application claims priority to foreign French patent application No. FR 1912692, filed on Nov. 14, 2019, the disclosure of which is incorporated by reference in its entirety.

FIELD OF THE INVENTION

The present invention concerns a satellite locating and communication method and system for a fixed radio terminal on the ground using at least one non-geostationary satellite.

BACKGROUND

The present invention applies in particular to the field of low-speed sporadic space communications with global coverage between smart objects belonging to the Internet of Things (IoT). In this case, each of the smart objects has a radio terminal that, while being able to transmit radio signals only at very low transmission level, is capable of communicating with a satellite constellation of non-geostationary satellites, which can be reduced to a single non-geostationary satellite either permanently or in an initial implementation phase of the constellation.

The known systems ORBCOM, IRIDIUM and ARGOS currently in operation provide a communication and locating service having global coverage, with the ARGOS system providing the most precise locating. All of these systems are designed to ensure positive loopback of the link budget of the uplink from the terminal to the visible satellite or satellites, a link budget having positive loopback when the level of the signal-to-noise ratio at the satellite receiver is above a predetermined demodulation threshold. All of these systems also require combination of information from multiple satellites within sight of the transmitting terminal.

A first technical problem is that of providing a locating method and system for a radio terminal, which is fixed or mobile at low speed on the ground, that is compatible with the use of a single non-geostationary satellite and with a link budget without positive loopback between the terminal and the satellite.

Moreover, it is necessary to determine a locating technique that allows the precision for locating the ground terminal to be increased and the complexity of reception at a satellite of the constellation to be reduced. In a known manner, the locating of a fixed or low-speed mobile terminal on the ground in transmission mode from one or more satellites is based on techniques for measuring time of arrival of the signal TDOA («Time Difference Of Arrival») and/or frequency of arrival of the signal FDOA («Frequency Difference Of Arrival») and/or for measuring Doppler drift, and/or for measuring the angle of arrival of the signal. The technical solutions TDOA and FDOA are based on measurements taken on multiple satellites and cannot solve the first technical problem. The technical solution based on Doppler drift is simple in terms of processing but not very precise. A technical solution based on measuring the angle of arrival of the signal by means of interferometry associated with a Doppler measurement seems promising owing to its accessibility by a single satellite. By way of example, the patent U.S. Pat. No. 10,126,405 B2 describes such a system. When a 1D one-dimensional interferometry is used, good locating precision is achieved by processing the information over a broad interferometric base with a priori knowledge of the geographical position of the satellite. Conventionally, a 1D one-dimensional interferometry involves a linear network antenna made up of antenna elements spaced by half a wavelength $\lambda/2$ of the carrier of the radio signal so as to be able to determine the angle of arrival without folding of the network lobes of the antenna and unambiguously while allowing a high antenna gain to be achieved. Such a solution nevertheless has the disadvantage of a high level of complexity for satellite reception in terms of development of the antenna, the arrangement of the antenna on the platform and tricky radiation tests.

A second technical problem is that of providing a locating method and system for a radio terminal, which is fixed on the ground, that are compatible with the use of a single non-geostationary satellite and with a link budget without positive loopback between the terminal and the satellite, and with a simpler and less bulky satellite receiving antenna.

SUMMARY OF THE INVENTION

To this end, the subject of the invention is a locating and communication method for a radio terminal, implemented by a satellite system comprising one or more non-geostationary satellites with global coverage, one or more radio terminals to be located, which is/are visible from the satellite or satellites during first time windows F1 for the satellite or satellites to listen to the terminals, and at least one satellite access and processing ground station that is visible from the satellite or satellites during second time windows F2 for repatriating communication data and locating radio terminals to be located.

The method is characterized in that it comprises the steps of: a radio terminal periodically transmitting a repeating sequence a predetermined number of times N, which is greater than or equal to 2, for the same data packet with unencoded access or with access encoded according to a predetermined access encoding scheme, which data packet is time-shifted by the same predetermined time shift $\Delta\tau$ each time, each data packet with unencoded or unencoded access being modulated onto a radio-frequency carrier with a predetermined wavelength to form an RF communication and locating signal; then the non-geostationary satellite receiving, via a single antenna with a large angular aperture, in the first listening window of said satellite, from a start-of-acquisition date and during a predetermined acquisition period, a listening signal formed by the radio-frequency communication and locating signal transmitted by the radio-frequency terminal and all the other radio-frequency signals perceptible in the same frequency band as that of said communication and locating signal, forming a listening signal, then digitizing the listening signal at the carrier frequency or at an intermediate frequency to produce an acquisition data packet and dating the acquisition data packet according to a high-precision clock of the satellite, backing up the dated acquisition packet, then repatriating the data of the dated acquisition packet to the access and processing ground station in the second repatriation time window by means of a high-speed downlink transmission of the digitized listening signal; then the satellite access and processing ground station determining the location of the radio terminal from the data packets with unencoded access or with encoded access, which are extracted from the dated digitized listening signal and from the same sequence associated with said radio terminal, and from the ephemerides of the satellite by using a technique for measuring angle or angles of arrival by means of sequenced interferometry associated with a technique for measuring Doppler drift or drifts.

According to particular embodiments, the locating and communication method comprises one or more of the following features:

the satellite or each satellite of the constellation moves at a speed of movement in relation to Earth having a predetermined modulus v and the time shift of two successive packets of the sequence is greater than or equal to the ratio of the wavelength of the radio-frequency carrier of the radio-frequency signal to twice the modulus v of the speed of movement of the satellite;

each data packet with unencoded access, repeated N times while being time-shifted by the same time shift $\Delta\tau$ each time, has a frame formed by a synchronization header, by an identifier of the radio terminal forming the transmitter of said packet, and by communication payload data to be transmitted; or each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes including a fixed synchronization header, an identifier of the radio terminal forming the transmitter of said packet and communication payload data to be transmitted, each PN code being a cyclic sequence phase-shifted each time by a phase shift corresponding to the time shift $\Delta\tau$; or each data packet with encoded access, repeated N times while being time-shifted by the same time shift $\Delta\tau$ each time, has a frame, formed by an identifier of the radio terminal forming the transmitter of said packet, and by communication payload data to be transmitted, and modulated by a sub-carrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero;

one or two angles of arrival are determined unambiguously by means of sequenced interferometry associated with the measurement of the Doppler drift;

the satellite access and processing ground station extracts the N packets of the sequence transmitted by the radio terminal from the repatriated digitized listening signal by transposing the repatriated digitized listening signal to baseband or to an intermediate-frequency band; then by decoding and demodulating the transposed listening signal according to the access scheme used, to produce a sequence of the N packets that are received by the satellite, decoded according to the access encoding, when it exists, and demodulated, an estimation of the Doppler drift and an estimation of the time shift between the consecutive packets of the sequence being carried out in parallel; then locates the radio terminal identified according to one or two angles of arrival from the time shifts on reception from the estimated satellite, the dating of the listening sequence and the ephemerides of the satellite, by using a sequenced interferometry;

the number N of repetitions of the same packet in a sequence transmitted by the radio terminal is between 2 and 16, preferably 2 and 8 and/or the number N of repetitions of the same packet in a sequence transmitted by the radio terminal is dependent on the link budget of the uplink from the radio terminal in transmission mode and the satellite in listening mode;

the satellite system has a single non-geostationary satellite with global coverage and the single satellite receives at least two sequences of the same packet from the radio-frequency terminal during the same visit to the same listening time window on two separate arcs of the orbit or during two different visits to two different listening time windows; or the satellite system has a constellation of at least two satellites and at least two satellites each receive the same sequence of the same packet in respective listening time windows that are close or overlap;

at least two measurements of non-coplanar angles of arrival and of associated Doppler drifts are determined and allow unambiguous 3D three-dimensional locating of the radio-frequency terminal situated on the ground;

each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes including a fixed synchronization header, an identifier of the radio terminal forming the transmitter of said packet and communication payload data to be transmitted, each PN code being a cyclic sequence phase-shifted each time by a phase shift corresponding to the time shift $\Delta\tau$; and the satellite access and processing ground station for the digitized listening signal repatriated on the access downlink implements the steps of: transposing the repatriated digitized listening signal to baseband or to an intermediate-frequency band; then demodulating and decoding the transposed listening signal to produce N packets of the same received sequence, which are associated with said radio terminal and received by the satellite, and carrying out an estimation of the Doppler drift and an estimation of the time shift between the consecutive packets of the sequence in parallel, by correlating the digitized listening signal with the N replicas of the expected PN codes in parallel; then by estimating the time shifts between the consecutive packets of the sequence from the correlation peaks obtained; then determining the location of the radio terminal from the time shifts between the consecutive packets of the sequence, from the dating of the listening sequence and from the ephemerides of the satellite by using a technique for measuring angle or angles of arrival by means of sequenced interferometry associated with a technique for measuring Doppler drift or drifts;

each data packet with encoded access, repeated N times while being time-shifted by the same time shift $\Delta\tau$ each time, has a frame, formed by a synchronization header, by an identifier of the radio terminal forming the transmitter of said packet, and by communication payload data to be transmitted, and modulated by a sub-carrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero; and the access and processing ground station for the digitized listening signal repatriated on the access downlink implements the steps of: transposing the repatriated digitized listening signal to baseband or to an intermediate-frequency band; then demodulating and decoding the transposed listening signal to produce N packets of the same received sequence, which are associated with said radio terminal and received by the satellite, and carrying out an estimation of the Doppler drift and an estimation of the time shift between the consecutive packets of the sequence in parallel, by correlating the listening signal with the signals of the N packets of the sequence by means of an expected frequency readjustment of said signals of the N packets and by summing the signals of said frequency-readjusted packets by applying to each one a specific phase shift allowing said value of the signal-to-noise ratio to be increased; then by estimating the time shifts between the consecutive packets of the sequence from the signals of the demodulated packets; then determining the location of the radio terminal from the time shifts between the consecutive packets of the sequence, from the dating of the listening sequence and from the ephemerides of the satellite by using a technique for measuring angle or angles of arrival by means of sequenced interferometry associated with a technique for measuring Doppler drift or drifts.

The subject of the invention is also a locating and communication system for at least one radio terminal, comprising one or more non-geostationary satellites of a constellation with global coverage, one or more radio terminals to be located, which is/are visible from the satellite or satellites during first time windows F1 for the satellite or satellites to listen to the terminals, and at least one satellite access and processing ground station that is visible from the satellite or satellites during second time windows F2 for repatriating communication data and locating radio terminals to be located.

The communication system is characterized in that: each radio terminal is configured to periodically transmit a repeating sequence a predetermined number of times N, which is greater than or equal to 2, for the same data packet with unencoded access or with access encoded according to a predetermined access scheme, which data packet is time-shifted by the same predetermined time shift Δτ each time, each data packet with unencoded access or access encoded according to the access scheme being modulated onto a radio-frequency carrier with a predetermined wavelength to form an RF communication and locating signal; and each non-geostationary satellite has a single, nondirectional listening antenna with a large angular aperture, and is configured, via its listening antenna, to receive, in its first listening window, from a start-of-acquisition date and during a pre-determined acquisition period, a listening signal formed by the radio-frequency communication and locating signal transmitted by the radio-frequency terminal and all the other radio-frequency signals perceptible in the same frequency band as that of said communication and locating signal, then to digitize the listening signal at the carrier frequency or at an intermediate frequency to produce an acquisition data packet and to date the data packet according to a high-precision clock of the satellite, to back up the dated packet, then to repatriate the data of the dated acquisition packet to the access and processing ground station in the second repatriation time window by means of a high-speed downlink transmission of the digitized listening signal; and the satellite access and processing ground station has one or more electronic computers in order to determine the location of each radio terminal from the dated data packets with unencoded access or with encoded access, which are extracted from the dated digitized listening signal, and from the ephemerides of the satellite or satellites of the constellation by using a technique for measuring angle or angles of arrival by means of sequenced interferometry associated with a technique for measuring Doppler drift or drifts.

According to particular embodiments, the locating and communication system comprises one or more of the following features:

the satellite or satellites each describe an orbit included in the set of low Earth orbits LEO and medium Earth orbits MEO, and the satellite or each satellite of the constellation moves at a speed of movement in relation to Earth having a predetermined modulus v and the time shift of two successive packets of the sequence is greater than or equal to the ratio of the wavelength of the radio-frequency carrier of the radio-frequency signal to twice the modulus v of the speed of movement of the satellite.

The subject of the invention is also a locating and communication terminal comprising a low-power radio-frequency transmitter, coupled to a nondirectional, preferably omnidirectional, transmitting antenna, and a baseband transmitting module connected upstream of the radio-frequency transmitter. The radio terminal is characterized in that the radio-frequency transmitter, the transmitting antenna of the terminal and the baseband transmitting module are configured to periodically transmit a repeating sequence a predetermined number of times N, which is greater than or equal to 2, for the same data packet with unencoded access or with access encoded according to a predetermined access encoding scheme, which data packet is time-shifted by the same predetermined time shift Δτ each time, each data packet with unencoded or unencoded access being modulated onto a radio-frequency carrier with a predetermined wavelength to form an RF communication and locating signal.

According to particular embodiments, the locating and communication terminal comprises one or more of the following features:

the time shift of two successive packets of the sequence is greater than or equal to the ratio of the wavelength of the radio-frequency carrier of the radio-frequency signal to twice the modulus v of the speed of movement of the satellite; and each data packet with unencoded access, repeated N times while being time-shifted by the same time shift Δτ each time, has a frame formed by a synchronization header, by an identifier of the radio terminal forming the transmitter of said packet, and by communication payload data to be transmitted; or each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes including a fixed synchronization header, an identifier of the radio terminal forming the transmitter of said packet and communication payload data to be transmitted, each PN code being a cyclic sequence phase-shifted each time by a phase shift corresponding to the time shift Δτ; or each data packet with encoded access, repeated N times while being time-shifted by the same time shift Δτ each time, has a frame, formed by an identifier of the radio terminal forming the transmitter of said packet, and by communication payload data to be transmitted, and modulated by a subcarrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero.

The subject of the invention is also a non-geostationary satellite of a satellite communication and locating system for radio terminals situated on the ground, comprising a platform in order to move the satellite onto an orbit of LEO or MEO type and comprising a listening receiving antenna, an RF listening satellite receiver, a digitization unit and a backup mass memory, which are connected in series. The satellite is characterized in that: the listening receiving antenna is a single nondirectional antenna with a large angular aperture, preferably a simple cone, and the receiving antenna and the RF satellite receiver are configured to receive, in a first satellite listening window, from a start-of-acquisition date and during a predetermined acquisition period, a listening signal formed by a radio-frequency communication and locating signal transmitted by a radio-frequency terminal and all the other radio-frequency signals perceptible in the same frequency band as that of said communication and locating signal, forming a listening signal; and the digitization unit is configured to digitize a listening signal at the carrier frequency or at an intermediate frequency to produce an acquisition data packet and to date the data packet according to a high-precision onboard clock, the listening signal containing a radio-frequency communication and locating signal transmitted by the radio-frequency terminal to be located; and the mass memory is configured to back up the dated acquisition packet.

The subject of the invention is also an access and processing ground station of a satellite communication and locating system for radio terminals situated on the ground, comprising a ground receiver for a downlink for repatriating listening data, a digital processing unit, and in which the ground receiver and the digital processing unit (308) are configured to extract from the repatriated digitized listening signal a sequence of N packets repeated and shifted by the same predetermined time shift Δτ each time, with unencoded access or with access encoded according to a predetermined access scheme, in a sequence transmitted by a radio terminal: by transposing the repatriated digitized listening signal to baseband or to an intermediate-frequency band; then by decoding and demodulating the transposed listening signal according to the access scheme used, to produce a sequence of the N packets that are received by the satellite, decoded according to the access encoding, when it exists, and demodulated, an estimation of the Doppler drift and an estimation of the time shift between the consecutive packets of the sequence being carried out in parallel; and to locate the radio terminal identified according to one or two angles of arrival from the time shifts on reception from the estimated satellite, the dating of the listening sequence and the ephemerides of the satellite, by using a sequenced interferometry.

BRIEF DESCRIPTION OF THE DRAWINGS

Other features and advantages of the present invention will become more apparent on reading the description that follows with reference to the appended drawings, in which.

DETAILED DESCRIPTION

Figure 1:
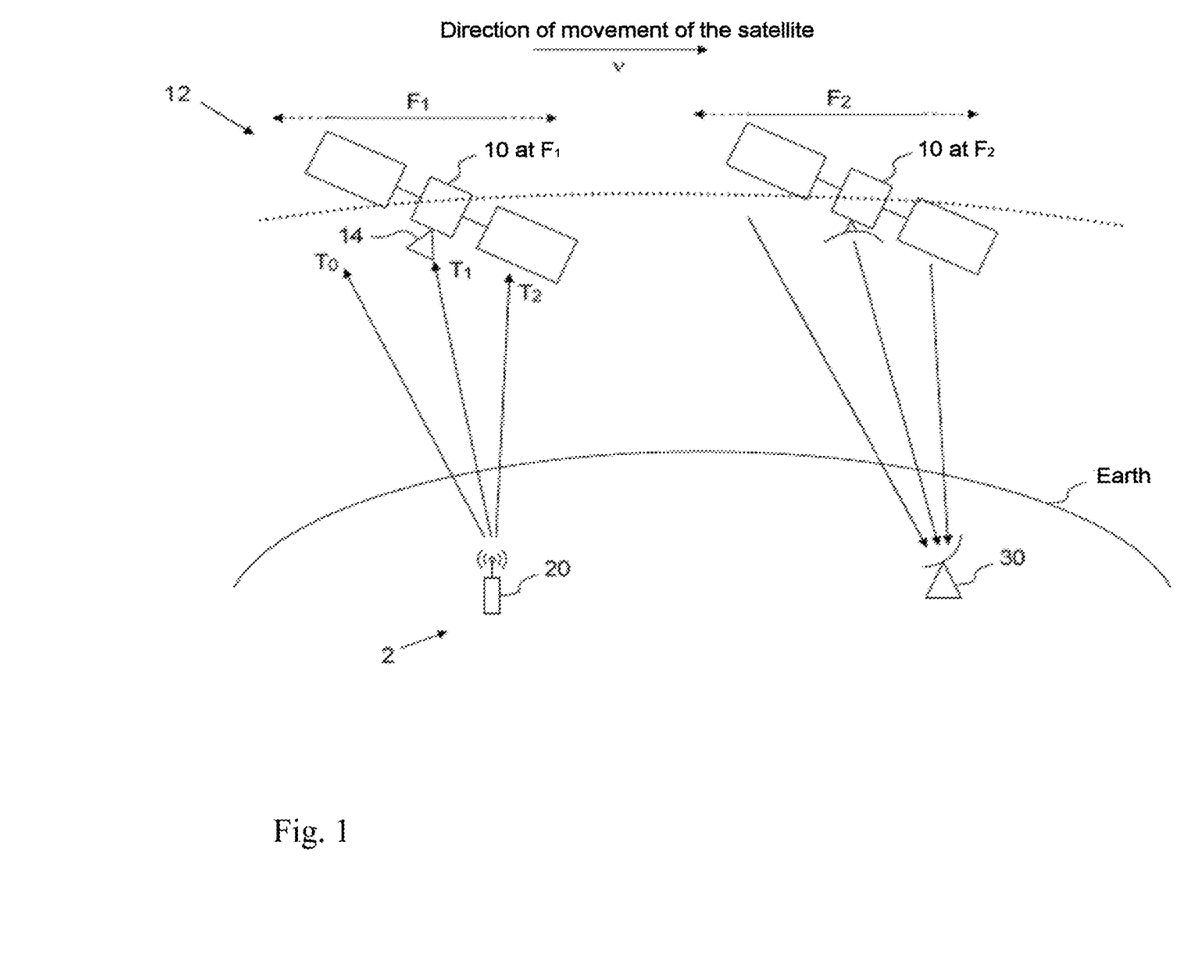
FIG. 1 shows the architecture of a satellite locating and communication system for at least one radio terminal according to the invention.

As shown in FIG. 1, a satellite communication and locating system 2 for at least one radio terminal comprises one or more non-geostationary satellites 10 of a constellation 12 with global coverage, one or more radio terminals 20 to be located, which is/are visible from the satellite or satellites 10 during first time windows F1 for the satellite or satellites 10 to listen to the terminals 10, and at least one satellite access and processing ground station 30 that is visible from the satellite or satellites 10 during second time windows F2 for repatriating communication data and locating radio terminals to be located.

In this case, to simplify matters and clarify the illustration, FIG. 1 shows a single terminal 20, a single non-geostationary satellite 10 of the constellation 12, a single first listening time window F1 and a single second repatriation window F2 for the data.

It should be noted that the satellite communication and locating system 2 according to the architecture of the invention can work with any number of radio terminals, greater than or equal to 1, subject to appropriate dimensioning of the transmission capabilities of the components of said system.

It should be noted that the satellite communication and locating system 2 according to the architecture of the invention can work with a constellation with global coverage limited to a single satellite. In this case, the time taken to locate a terminal anywhere on the terrestrial globe may be long.

Figure 2:
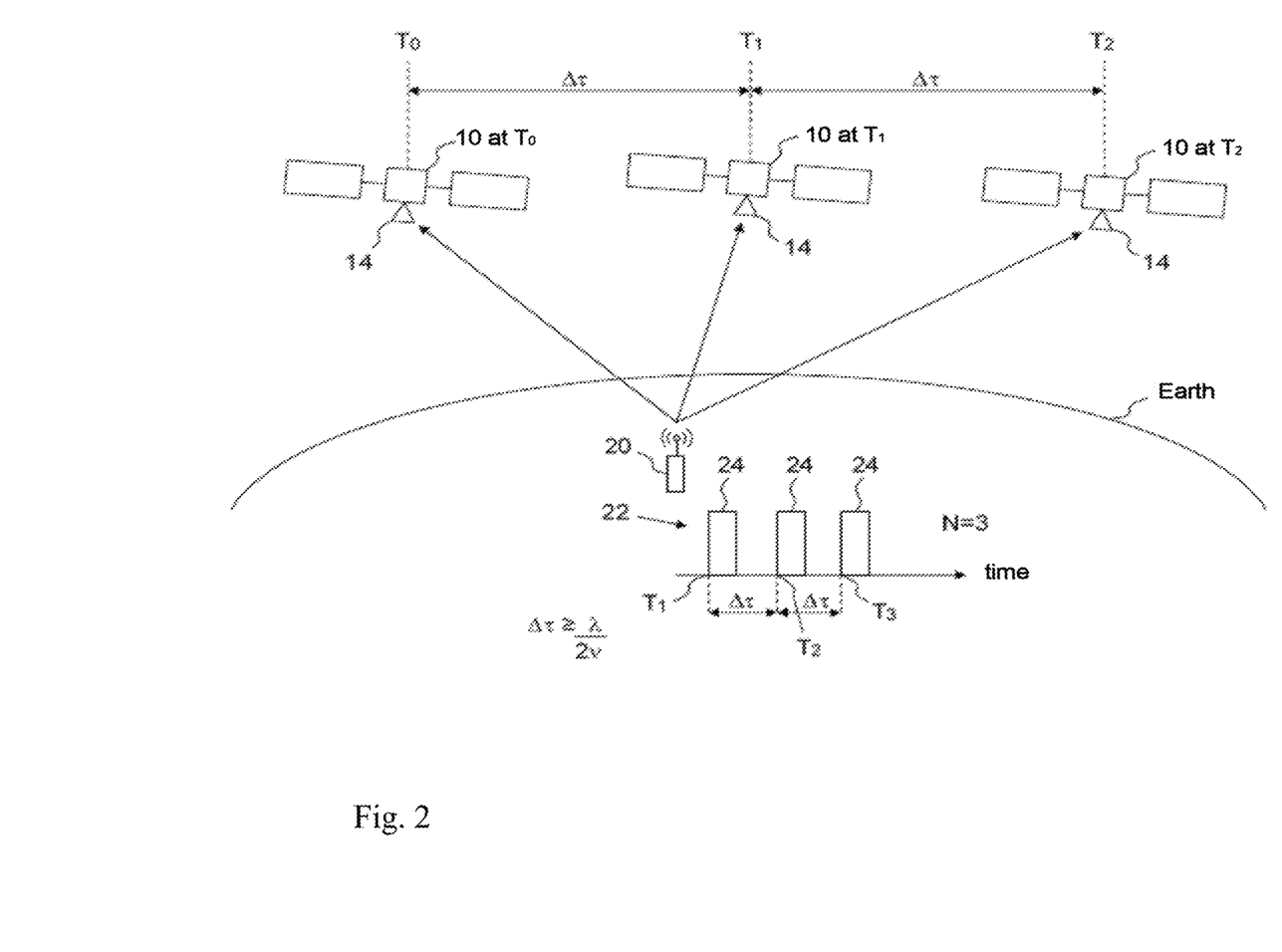
FIG. 2 shows a succession of views of the implementation of the satellite communication and locating system of FIG. 1 during the phase of transmission of locating packets by a locating terminal to a non-geostationary satellite.

As shown in FIGS. 1 and 2, each radio terminal 20 is configured to periodically transmit a repeating sequence 22 a predetermined number of times N, which is greater than or equal to 2, for the same data packet 24 with unencoded access or with access encoded according to a predetermined access scheme, which data packet is time-shifted by the same predetermined time shift Δτ each time, each data packet 24 with unencoded access or access encoded according to the access scheme being modulated onto a radio-frequency carrier with a predetermined wavelength to form an uplink RF locating and communication signal.

As shown in FIGS. 1 and 2, each satellite 10, in this case a single one shown, has a single, nondirectional listening antenna 14 with a large angular aperture, and is configured, via its listening antenna 14, to receive, in its first listening window F1, from a start-of-acquisition date and during a predetermined acquisition period, a listening signal formed by the uplink radio-frequency communication and locating signal transmitted by the radio-frequency terminal 20 and all the other radio-frequency signals perceptible in the same frequency band as that of said communication and locating signal, then to digitize the listening signal at the carrier frequency or at an intermediate frequency to produce an acquisition data packet and to date the data packet according to a high-precision clock of the satellite, to back up the dated packet, then to repatriate the data of the dated packet to the access and processing ground station in the second repatriation time window by means of a high-speed downlink transmission of the digitized listening signal.

Generally, the satellite or satellites 10 of the constellation 12 each describe an orbit included in the set of low Earth orbits LEO and medium Earth orbits MEO. Furthermore, the satellite or each satellite 10 of the constellation 12 moves at a speed of movement in relation to Earth having a predetermined modulus v and the time shift $\Delta\tau$ of two successive packets of the sequence is greater than or equal to the ratio of the wavelength 2L of the radio-frequency carrier of the radio-frequency signal to twice the modulus v of the speed of movement of the satellite.

As shown in FIG. 1, the satellite access and processing ground station 30 has one or more electronic computers in order to determine the location of each radio terminal from the dated data packets with unencoded access or with encoded access, which are extracted from the dated digitized listening signal, and from the ephemerides of the satellite or satellites of the constellation by using a technique for measuring angle or angles of arrival by means of sequenced interferometry associated with a technique for measuring Doppler drift or drifts.

The satellite access and processing station 30 recovers all of the listening signals recorded in the non-geostationary satellite 10 and allows said satellite to free its backup mass memory. The revisiting period of the non-geostationary satellite 10 in relation to the satellite access and processing station 30 is dependent on the orbitography parameters of the non-geostationary satellite and on the geographical position of the satellite access and processing station 30. By way of example, a non-geostationary satellite 10 in circular polar orbit will be visible to a satellite access and processing station 30 a greater number of times when said station is situated in the polar regions rather than on the equator.

Figure 3:
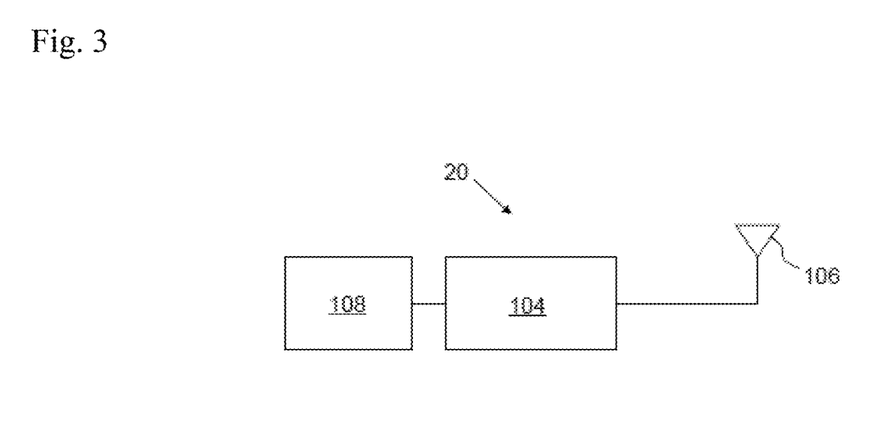
FIG. 3 shows the architecture of a radio terminal according to the invention in the satellite communication and locating system of FIG. 1.

As shown in FIG. 3, a locating and communication radio terminal 20 according to the invention, forming part of the locating and communication system of FIGS. 1 and 2, for example, comprises a low-power RF radio-frequency transmitter 104, coupled to a nondirectional, preferably omnidirectional, transmitting antenna 106, and a baseband transmitting module 108, connected upstream of the RF radio-frequency transmitter 104.

The RF radio-frequency transmitter 104, the transmitting antenna 106 of the terminal and the baseband transmitting module 108 are configured to periodically transmit a repeating sequence a predetermined number of times N, which is greater than or equal to 2, for the same data packet with unencoded access or with access encoded according to a predetermined access encoding scheme, which data packet is time-shifted by the same predetermined time shift $\Delta\tau$ each time, each data packet with unencoded or unencoded access being modulated onto a radio-frequency carrier with a predetermined wavelength to form an RF communication and locating signal.

Generally, the time shift of two successive packets of the sequence is greater than or equal to the ratio of the wavelength of the radio-frequency carrier of the uplink radio-frequency signal bound for the non-geostationary satellite to twice the modulus v of the speed of movement of the non-geostationary satellite.

According to a first embodiment of the locating and communication terminal, the baseband transmitting module is configured so that each data packet with unencoded access, repeated N times while being time-shifted by the same time shift $\Delta\tau$ each time, has a frame formed by a synchronization header, by an identifier of the radio terminal forming the transmitter of said packet, and by communication payload data to be transmitted.

According to a second embodiment of the locating and communication terminal, the baseband transmitting module is configured so that each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes, including a fixed synchronization header, an identifier of the radio terminal forming the transmitter of said packet and communication payload data to be transmitted, each PN code being a cyclic sequence phase-shifted each time by a phase shift corresponding to the time shift $\Delta\tau$.

According to a third embodiment of the locating and communication terminal, the baseband transmitting module is configured so that each data packet with encoded access, repeated N times while being time-shifted by the same time shift $\Delta\tau$ each time, has a frame, formed by an identifier of the radio terminal forming the transmitter of said packet, and by communication payload data to be transmitted, and modulated by a subcarrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero, i.e. the smallest frequency hop and the largest frequency hop being of equal amplitude and having opposite signs.

Optionally, the locating and communication radio terminal can comprise a receiver, connected via a duplexer to the nondirectional transmitting antenna or to a second nondirectional receiving antenna.

The receiver is configured to receive signalling messages, for example synchronization or frequency correction messages, or communication payload data bound for said terminal, via a downlink from the non-geostationary satellite or satellites.

The locating and communication radio terminal may be fixed in relation to the ground of Earth, or installed on a terrestrial or maritime cellphone progressing at a relatively low speed of movement in relation to the speed of the non-geostationary satellites.

Figure 4:
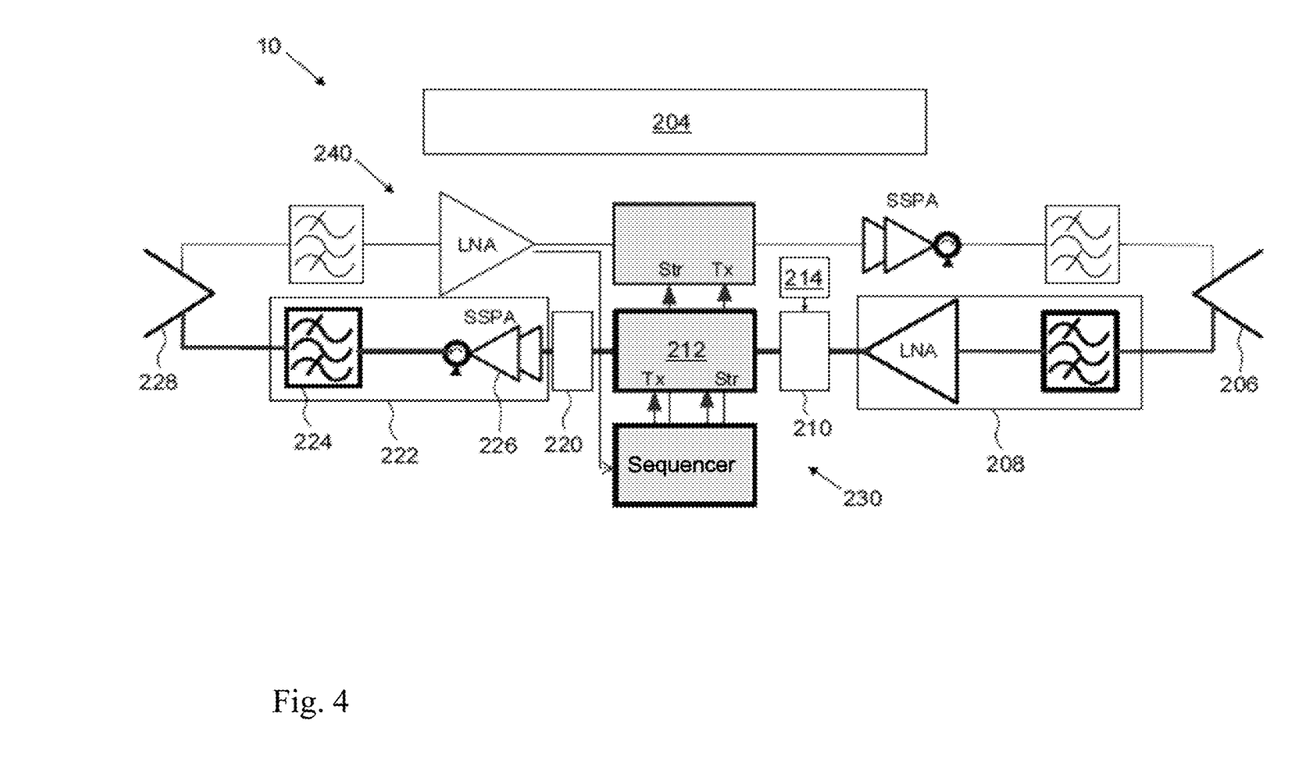
FIG. 4 shows an example of architecture of the non-geostationary satellite according to the invention in the satellite communication and locating system of FIG. 1, in particular the architecture of the payload for listening and for repatriation of the listening data.

As shown in FIG. 4, the non-geostationary locating and communication satellite 10 according to the invention, which is a component of the locating and communication system 2 of FIGS. 1 and 2, comprises a platform 204 in order to move the satellite onto an orbit of LEO or MEO type.

The non-geostationary satellite 10 comprises an RF listening receiving antenna 206, an RF listening satellite receiver 208, a digitization unit 210 and a backup mass memory 212, which are connected in series.

The RF listening receiving antenna 206 is a single non-directional antenna with a large angular aperture, for example a simple cone, configured to receive the RF radio signals transmitted in the uplink transmitted by one or more radio terminals in a band of frequencies included in the set of frequency bands HF, VHF, UHF, L, S, C, X, Ku, Ka, V and Q.

The RF listening receiving antenna 206 and the RF listening satellite receiver 208 are configured to receive, in a first satellite listening window F1, from a start-of-acquisition date and during a predetermined acquisition period, a listening signal formed by a radio-frequency communication and locating signal transmitted by a radio-frequency terminal and all the other radio-frequency signals perceptible in the same frequency band as that of said communication and locating signal, forming a listening signal.

The digitization unit 210 is configured to digitize the listening signal at the carrier frequency or at an intermediate frequency to produce an acquisition data packet and to date the acquisition data packet according to its date of arrival using a high-precision onboard clock 214, the listening signal containing a radio-frequency communication and locating signal transmitted by the radio-frequency terminal to be located.

The mass memory 212 is configured to back up the dated acquisition data packet.

Thus, the non-geostationary satellite 10 can detect, date the arrival of, digitize and back up the listening signals that it receives from the radio terminals in the RF listening band in order to subsequently retransmit said digitized and dated listening signals to the satellite access and processing station when an RF downlink for repatriating the data can be set up between the non-geostationary satellite and said access and processing station. In order to ensure that the backed up listening data are repatriated, the non-geostationary satellite 10 has a modulator 220 for the digitized and dated listening data, an RF transmitter 222 for repatriating the digitized and modulated listening data, including an RF filter 224 and an RF power amplifier 226, for example in this case an SSPA («Solid State Power Amplifier»), and an RF transmitting antenna 228 for repatriation in the associated downlink.

The modulator 220 for repatriating the listening data, the RF transmitter 222 and the RF transmitting antenna 228 for repatriating the listening data are connected in series and downstream of the backup memory for the listening data 212.

As already indicated, according to a first embodiment the digitization of the listening signals and the backup thereof can be implemented without modifying the carrier frequency by using an adequate sampling frequency that allows each listening signal to be completely reconstructed from the samples thereof.

According to a second embodiment, the digitization unit 210 is configured to perform a frequency transposition on the received listening signals before backing them up. In particular, the listening signals are transposed to baseband before being backed up.

As already indicated, each backed up listening signal has an associated date of arrival representing the date of the start of acquisition by the non-geostationary satellite 10 during a predetermined acquisition period.

The high-precision onboard clock 214 that provides the start-of-acquisition date associated with each listening signal received by the non-geostationary satellite is an atomic clock, for example synchronized with the high-precision clock of the satellite access and processing station 30 when it is overflown by the non-geostationary satellite or with clocks derived from other orbiting satellites such as satellites of the GPS and Galileo systems.

The modulation of the carrier implemented on the repatriation downlink by the modulator 220 for repatriating the listening data is for example a BPSK («Binary Phase Shift Keying») modulation or an MSK («Minimum Shift Keying») modulation.

The carrier frequency modulated by the modulator 220 for repatriating the listening data is a frequency included in the frequency bands L, S, C, X, Ka, Ku, V and Q.

The transmitting antenna 228 for repatriating the listening data to the satellite access and processing station 30 is preferably a directional antenna.

The satellite 228 transmitting antenna 228 for repatriating the listening data is a directional antenna, having a fixed radiating pattern that ensures a budget for the link between the non-geostationary satellite 10 and the satellite access and processing station 30 with positive loopback for a transmitted power of the transmitter 222 and a fixed directional radiating pattern of the receiving antenna of the satellite access and processing station.

The RF listening receiving antenna 206, the RF listening satellite receiver 208, the digitization unit 210, the backup mass memory 212, the onboard clock 214, the modulator 220 for repatriating the listening data, the RF transmitter 222 for repatriating the listening data and the RF transmitting antenna 228 for repatriating the listening data form a listening payload 230.

Optionally, the non-geostationary satellite 10 can comprise a communication payload 240 for transfer of transmitted communication and/or signalling data by the satellite access and processing station to the radio terminals. In this case, in reception mode the communication payload 240 in FIG. 4 shares the transmitting antenna for the listening payload 230 by being connected thereto via a first duplexer, which is not shown in FIG. 4, and in transmission mode it shares the receiving antenna for the listening payload by being connected thereto via a second duplexer, which is also not shown in FIG. 4.

Figure 5:
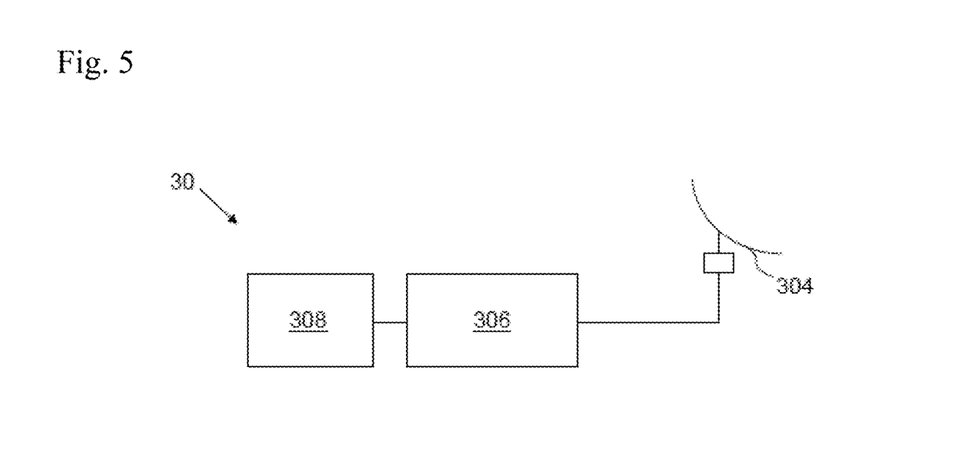
FIG. 5 shows the architecture of the satellite access and processing station according to the invention, which is a component of the satellite communication and locating system of FIG. 1.

As shown in FIG. 5, an access and processing ground station 30 according to the invention, which is a component of the locating and communication system 2 of FIGS. 1 and 2, comprises a ground receiving antenna 304 for the repatriated listening data, a ground receiver 306 for the downlink for repatriating the listening data and a ground digital processing unit 308.

The ground receiving antenna 304 is assumed to be sufficiently directional to ensure a link budget with positive loopback in unison with the satellite transmitting antenna and the satellite transmitter for the repatriated listening data.

The ground receiver 306 and the ground digital processing unit 308 are configured to:

extract from the repatriated digitized listening signal a sequence of N packets repeated and shifted by the same predetermined time shift $\Delta\tau$ each time, with unencoded access or with access encoded according to a predetermined access scheme, in a sequence transmitted by a radio terminal:

by transposing the repatriated digitized listening signal to baseband or to an intermediate-frequency band; then by decoding and demodulating the transposed listening signal according to the access scheme used, to produce a sequence of the N packets that are received by the satellite, decoded according to the access encoding, when it exists, and demodulated, an estimation of the Doppler drift and an estimation of the time shift between the consecutive packets of the sequence being carried out in parallel; and to locate the radio terminal identified according to one or two angles of arrival from the time shifts on reception from the estimated satellite, the dating of the listening sequence and the ephemerides of the satellite, by using a sequenced interferometry.

Optionally, the satellite access and processing station 30 may moreover be configured to transmit signalling and/or communication data to one or more non-geostationary satellites 10 or via one or more non-geostationary satellites to the radio terminal 20. By way of example, the signalling data concern data for correcting or helping to correct drifts in the onboard clock that is installed in the non-geostationary satellite 10 and used for dating the arrival of the received listening signals.

Figure 6:
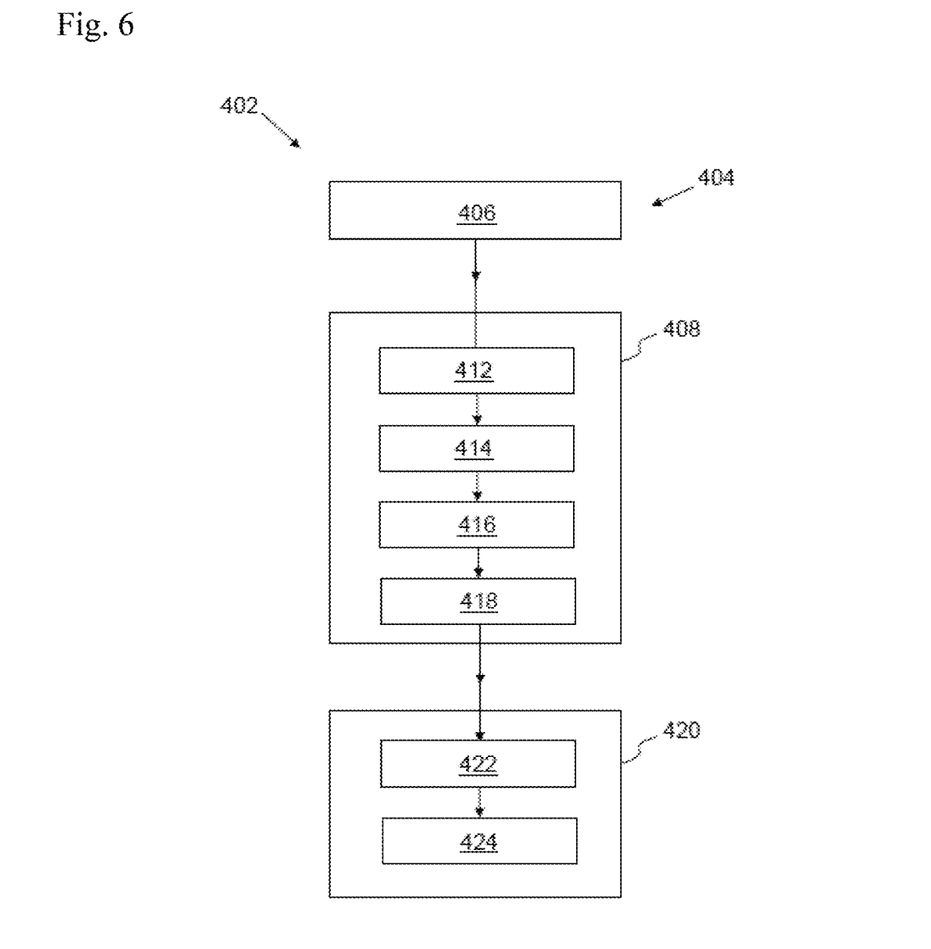
FIG. 6 shows a flowchart for the communication and locating method for at least one radio terminal according to the invention implemented by the satellite communication and locating system of FIG. 1.

As shown in FIG. 6, a communication and locating method 402 for a radio terminal according to the invention is implemented by the communication and locating satellite system 2 of FIG. 1. The communication and locating method 402 comprises a set 404 of steps.

In a first step 406, a radio terminal 10 periodically transmits a repeating sequence a predetermined number of times N, which is greater than or equal to 2, for the same data packet with unencoded access or with access encoded according to a predetermined access encoding scheme, which data packet is time-shifted by the same predetermined time shift $\Delta\tau$ each time, each data packet with unencoded or unencoded access being modulated onto a radio-frequency carrier with a predetermined wavelength to form an RF communication and locating signal.

It should be noted that, generally, the number N of repetitions of the same packet in a sequence transmitted by the radio terminal is dependent on the link budget of the uplink from the radio terminal in transmission mode and the satellite in listening mode. In particular, the number N of repetitions of the same packet in a sequence transmitted by the radio terminal is between 2 and 16, preferably 2 and 8.

Next, in a second step 408, the satellite 10 receives 412 via its single listening antenna with a large angular aperture, in the first listening window of said satellite, from a start-of-acquisition date and during a predetermined acquisition period, a listening signal formed by the radio-frequency communication and locating signal transmitted by the radio-frequency terminal 20 and all the other radio-frequency signals perceptible in the same frequency band as that of said communication and locating signal, forming a listening signal, then digitizes 414 the listening signal at the carrier frequency or at an intermediate frequency to produce an acquisition data packet and dates the acquisition data packet according to a high-precision clock of the satellite, backs up 416 the dated acquisition packet, then repatriates 418 the data of the dated acquisition packet to the access and processing ground station in the second repatriation time window by means of a high-speed downlink transmission of the digitized listening signal.

Next, in a third step 420, the satellite access and processing ground station determines the location of the radio terminal from the data packets with unencoded access or with encoded access, which are extracted from the dated digitized listening signal and from the same sequence associated with said radio terminal, and from the ephemerides of the satellite by using a technique for measuring angle or angles of arrival by means of sequenced interferometry associated with a technique for measuring Doppler drift or drifts.

When the third step 420 is implemented, the satellite access and processing ground station:
  extracts 422 the N packets of the sequence transmitted by the radio terminal from the repatriated digitized listening signal:
  by transposing the repatriated digitized listening signal to baseband or to an intermediate-frequency band; then
  by decoding and demodulating the transposed listening signal according to the access scheme used, to produce a sequence of the N packets that are received by the satellite, decoded according to the access encoding, when it exists, and demodulated, an estimation of the Doppler drift and an estimation of the time shift between the consecutive packets of the sequence being carried out in parallel; then
  locates 424 the radio terminal identified according to one or two angles of arrival from the time shifts on reception from the estimated satellite, the dating of the listening sequence and the ephemerides of the satellite, by using a sequenced interferometry.

Generally, the locating and communication method is performed by transmitting one or more sequences of packets and uses a satellite constellation of one or more satellites for listening and repatriation of the listening data.

In particular, when the constellation of the satellite system has a single non-geostationary satellite with global coverage, the single satellite receives at least two sequences of the same packet from the radio-frequency terminal during the same visit to the same listening time window at two distinct locations on the same arc of the orbit or during two different visits to two different listening time windows on two separate arcs of the orbit.

In particular, when the constellation of the satellite system has at least two satellites, at least two satellites each receive the same sequence of the same packet in respective listening time windows that are close or overlap.

In particular, at least two measurements of non-coplanar angles of arrival and of associated Doppler drifts are determined and allow unambiguous 3D three-dimensional locating of the radio-frequency terminal situated on the ground.

According to a first embodiment, referred to as «simple time sequence transmission mode», each data packet with unencoded access, repeated N times while being time-shifted by the same time shift $\Delta\tau$ each time, has a frame formed by a synchronization header, by an identifier of the radio terminal forming the transmitter of said packet, and by communication payload data to be transmitted.

According to a second embodiment, referred to as «sequenced pseudorandom PN code transmission mode», each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes including a fixed synchronization header, an identifier of the radio terminal forming the transmitter of said packet and communication payload data to be transmitted, each PN code being a cyclic sequence phase-shifted each time by a phase shift corresponding to the time shift M.

According to a third embodiment, referred to as «sequenced frequency hopping transmission mode», each data packet with encoded access, repeated N times while being time-shifted by the same time shift $\Delta\tau$ each time, has a frame, formed by an identifier of the radio terminal forming the transmitter of said packet, and by communication payload data to be transmitted, and modulated by a subcarrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero.

If the second embodiment of the transmission mode is used, the satellite access and processing ground station for the digitized listening signal repatriated on the repatriation downlink implements the steps of:

transposing the repatriated digitized listening signal to baseband or to an intermediate-frequency band; then demodulating and decoding the transposed listening signal to produce N packets of the same received sequence, which are associated with said radio terminal and received by the satellite, and carrying out an estimation of the Doppler drift and an estimation of the time shift between the consecutive packets of the sequence in parallel, by correlating the digitized listening signal with the N replicas of the expected PN codes in parallel; then by estimating the time shifts between the consecutive packets of the sequence from the correlation peaks obtained; then determining the location of the radio terminal from the time shifts between the consecutive packets of the sequence, from the dating of the listening sequence and from the ephemerides of the satellite by using a technique for measuring angle or angles of arrival by means of sequenced interferometry associated with a technique for measuring Doppler drift or drifts.

If the second embodiment of the transmission mode is used, the satellite access and processing ground station for the digitized listening signal repatriated on the repatriation downlink implements the steps of:

transposing the repatriated digitized listening signal to baseband or to an intermediate-frequency band; then demodulating and decoding the transposed listening signal to produce N packets of the same received sequence, which are associated with said radio terminal and received by the satellite, and carrying out an estimation of the Doppler drift and an estimation of the time shift between the consecutive packets of the sequence in parallel, by correlating the listening signal with the signals of the N packets of the sequence by means of an expected frequency readjustment of said signals of the N packets and by summing the signals of said frequency-readjusted packets by applying to each one a specific phase shift allowing said value of the signal-to-noise ratio to be increased; then by estimating the time shifts between the consecutive packets of the sequence from the signals of the demodulated packets; then determining the location of the radio terminal from the time shifts between the consecutive packets of the sequence, from the dating of the listening sequence and from the ephemerides of the satellite by using a technique for measuring angle or angles of arrival by means of sequenced interferometry associated with a technique for measuring Doppler drift or drifts.

A person skilled in the art will understand that the systems or subsystems according to the embodiments of the invention can be implemented in various ways by means of hardware, software or a combination of hardware and software, in particular in the form of program code that can be distributed in the form of a program product, in various forms. In particular, the program code can be distributed by means of computer-readable media, which can include computer-readable storage media and communication media. The methods described in the present invention can be implemented in particular in the form of computer program instructions executable by one or more processors in a computer information-processing device. These computer program instructions can also be stored on a computer-readable medium.

The satellite communication and locating system of FIG. 1 and the corresponding communication and locating method of FIG. 6 can be applied in particular to the Internet of Things (IoT), which involves objects that interact with their surroundings by means of one or more sensors and that are connected to a telecommunication network allowing them to send the captured data so that they can be analyzed and used. These so-called smart objects are characterized by a small quantity of data to be transmitted, sporadically or regularly, which usually corresponds to measurement statements, and a low level of transmission power owing to the fact that the power supply for these objects is generally based on batteries, rechargeable or otherwise. According to the applications, a smart object may be mobile and the determination of its location may be as significant as the data that it transmits. The IoT is essentially based on the cell-phone networks in order to allow objects equipped with a SIM card to send their data. Cellular networks more adapted to the IoT context providing a low bit rate and broad coverage are also rapidly developing, in this case LPWAN («Low-Power Wide-Area Network») networks. Cellular networks that provide for communication and location of smart objects nevertheless have several disadvantages linked especially to multipath propagation that arises in these networks, to the inability to provide global coverage that includes seas and oceans and to the cost of implementation. Satellite telecommunication networks allow global coverage at a reduced cost while allowing the signals transmitted by the IoT objects to be relayed and the location of said objects to be determined.

Moreover, the invention is not limited to the embodiments described above by way of nonlimiting example. It covers all variant embodiments that might be envisaged by a person skilled in the art.

The invention claimed is:

1. A locating and communication method for one or more radio terminals, implemented by a satellite system comprising one or more non-geostationary satellites with global coverage, the one or more radio terminals to be located, which is/are visible from the one or more non-geostationary satellites during first time windows F1 for the one or more non-geostationary satellites to listen to the radio terminals, and at least one satellite access and processing ground station that is visible from the one or more non-geostationary satellites during second time windows F2 for repatriating communication data and locating the radio terminals to be located, the method comprising the steps of:

a radio terminal of the one or more radio terminals periodically transmitting a repeating sequence a predetermined number of times N, which is greater than or equal to 2, for a data packet with unencoded access or with access encoded according to a predetermined access encoding scheme, which data packet is time-shifted by a predetermined time shift $\Delta\tau$ each time, each data packet with unencoded or encoded access being modulated onto a radio-frequency carrier with a predetermined wavelength $\lambda$ to form an RF communication and locating signal; then a non-geostationary satellite of the one or more non-geostationary satellites receiving, via a single antenna, in the first listening window of said satellite, from a start-of-acquisition date and during a predetermined acquisition period, a listening signal formed by the radio-frequency communication and locating signal transmitted by the radio-frequency terminal and all other radio-frequency signals perceptible in a same frequency band as that of said communication and locating signal, forming a listening signal, then digitizing the listening signal at a carrier frequency or at an intermediate frequency to produce an acquisition data packet and dating the acquisition data packet according to a high-precision clock of the satellite, backing up the dated acquisition packet, then repatriating data in the dated acquisition data packet to an access and processing ground station in a second repatriation time window by a high-speed downlink transmission of the digitized listening signal; then the access and processing ground station determining a location of the radio terminal from the data packets with unencoded access or with encoded access, which are extracted from the dated digitized listening signal and from a same sequence associated with said radio terminal, and from an ephemerides of the satellite by using a technique for measuring angle or angles of arrival by sequenced interferometry associated with a technique for measuring Doppler drift or drifts.

2. The locating and communication method according to claim 1, wherein each satellite of the one or more non-geostationary satellites moves at a speed of movement in relation to Earth having a predetermined modulus v and the time shift of two successive packets of the sequence is greater than or equal to a ratio of the wavelength λ of the radio-frequency carrier of the radio-frequency signal to twice the modulus v of the speed of movement of the satellite.

3. The locating and communication method according to claim 1, wherein:

each data packet with unencoded access, repeated N times while being time-shifted by the same time shift Δτ each time, has a frame formed by a synchronization header, by an identifier of the radio terminal forming the transmitter of said packet, and by communication payload data to be transmitted; or each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes including a fixed synchronization header, an identifier of the radio terminal forming the transmitter of said packet and communication payload data to be transmitted, each PN code being a cyclic sequence phase-shifted each time by a phase shift corresponding to the time shift Δτ; or each data packet with encoded access, repeated N times while being time-shifted by the same time shift Δτ each time, has a frame, formed by an identifier of the radio terminal forming the transmitter of said packet, and by communication payload data to be transmitted, and modulated by a subcarrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero.

4. The locating and communication method according to claim 1, wherein one or two angles of arrival are determined unambiguously by means of sequenced interferometry associated with the measurement of the Doppler drift.

5. The locating and communication method according to claim 1, wherein the satellite access and processing ground station extracts the N packets of the sequence transmitted by the radio terminal from the repatriated digitized listening signal:

by transposing the repatriated digitized listening signal to baseband or to an intermediate-frequency band; then by decoding and demodulating the transposed listening signal according to the access scheme used, to produce a sequence of the N packets that are received by the satellite, decoded according to the access encoding, when it exists, and demodulated, an estimation of the Doppler drift and an estimation of the time shift between the consecutive packets of the sequence being carried out in parallel, then locates the radio terminal identified according to one or two angles of arrival from the time shifts on reception from the estimated satellite, the dating of the listening sequence and the ephemerides of the satellite, by using a sequenced interferometry.

6. The locating and communication method according to claim 1, wherein:

the number N of repetitions of the same packet in a sequence transmitted by the radio terminal is between 2 and 16, preferably 2 and 8; and/or the number N of repetitions of the same packet in a sequence transmitted by the radio terminal is dependent on the link budget of the uplink from the radio terminal in transmission mode and the satellite in listening mode.

7. The locating and communication method according to claim 1, wherein:

the satellite system has a single non-geostationary satellite with global coverage and the single satellite receives at least two sequences of the same packet from the radio-frequency terminal during the same visit to the same listening time window on two separate arcs of the orbit or during two different visits to two different listening time windows; or the satellite system has a constellation of at least two satellites and at least two satellites each receive the same sequence of the same packet in respective listening time windows that overlap.

8. The locating and communication method according to claim 7, wherein at least two measurements of non-coplanar angles of arrival and of associated Doppler drifts are determined and allow unambiguous 3D three-dimensional locating of the radio-frequency terminal situated on the ground.

9. The locating and communication method according to claim 1, wherein:

each data packet with encoded access, repeated N times while being time-shifted by the same time shift each time, has a frame formed by a stack of N pseudorandom PN codes, of equal length and mutually orthogonal, that are modulated by data at a lower bit rate than that of the chips of the PN codes including a fixed synchronization header, an identifier of the radio terminal forming the transmitter of said packet and communication payload data to be transmitted, each PN code being a cyclic sequence phase-shifted each time by a phase shift corresponding to the time shift Δτ; and the satellite access and processing ground station for the digitized listening signal repatriated on the access downlink implements the steps of:

transposing the repatriated digitized listening signal to baseband or to an intermediate-frequency band; then demodulating and decoding the transposed listening signal to produce N packets of the same received sequence, which are associated with said radio terminal and received by the satellite, and carrying out an estimation of the Doppler drift and an estimation of the time shift between the consecutive packets of the sequence in parallel, by correlating the digitized listening signal with the N replicas of the expected PN codes in parallel; then by estimating the time shifts between the consecutive packets of the sequence from the correlation peaks obtained; then determining the location of the radio terminal from the time shifts between the consecutive packets of the sequence, from the dating of the listening sequence and from the ephemerides of the satellite by using a technique for measuring angle or angles of arrival by means of sequenced interferometry associated with a technique for measuring Doppler drift or drifts.

10. The locating and communication method according to claim 1, wherein:

each data packet with encoded access, repeated N times while being time-shifted by the same time shift Δτ each time, has a frame, formed by a synchronization header, by an identifier of the radio terminal forming the transmitter of said packet, and by communication payload data to be transmitted, and modulated by a subcarrier corresponding to a frequency hop vis-à-vis the carrier frequency, which frequency hop is different each time and the value of which frequency hop is dependent on the temporal rank of the data packet in the sequence, the sum of the smallest frequency hop and the largest frequency hop being zero; and the access and processing ground station for the digitized listening signal repatriated on the access downlink implements the steps of:

transposing the repatriated digitized listening signal to baseband or to an intermediate-frequency band; then demodulating and decoding the transposed listening signal to produce N packets of the same received sequence, which are associated with said radio terminal and received by the satellite, and carrying out an estimation of the Doppler drift and an estimation of the time shift between the consecutive packets of the sequence in parallel, by correlating the listening signal with the signals of the N packets of the sequence by means of an expected frequency readjustment of said signals of the N packets and by summing the signals of said frequency-readjusted packets by applying to each one a specific phase shift allowing said value of the signal-to-noise ratio to be increased; then by estimating the time shifts between the consecutive packets of the sequence from the signals of the demodulated packets; then determining the location of the radio terminal from the time shifts between the consecutive packets of the sequence, from the dating of the listening sequence and from the ephemerides of the satellite by using a technique for measuring angle or angles of arrival by means of sequenced interferometry associated with a technique for measuring Doppler drift or drifts.

11. A locating and communication satellite system for a one or more radio terminals, comprising:

one or more non-geostationary satellites of a constellation with global coverage, the one or more radio terminals to be located, which is/are visible from the one or more non-geostationary satellites during first time windows F1 for the one or more non-geostationary satellites to listen to the radio terminals, and at least one satellite access and processing ground station that is visible from the one or more non-geostationary satellites during second time windows F2 for repatriating communication data and locating radio terminals to be located, wherein:

each radio terminal of the one or more radio terminals is configured to periodically transmit a repeating sequence a predetermined number of times N, which is greater than or equal to 2, for a data packet with unencoded access or with access encoded according to a predetermined access scheme, which data packet is time-shifted by a predetermined time shift Δτ each time, each data packet with unencoded access or access encoded according to the predetermined access scheme being modulated onto a radio-frequency carrier with a predetermined wavelength λ to form an RF communication and locating signal; and each non-geostationary satellite of the one or more non-geostationary satellites has a single, nondirectional listening antenna, and is configured, via its listening antenna, to receive, in its first listening window, from a start-of-acquisition date and during a predetermined acquisition period, a listening signal formed by the radio-frequency communication and locating signal transmitted by the radio-frequency terminal and all other radio-frequency signals perceptible in a same frequency band as that of said communication and locating signal forming a listening signal, the listening signal at a carrier frequency or at an intermediate frequency to produce an acquisition data packet and to date the acquisition data packet according to a high-precision clock of the satellite, to back up the dated acquisition packet then to repatriate data in the dated acquisition packet to an access and processing ground station in a second repatriation time window by a high-speed downlink transmission of the digitized listening signal; and the at least on satellite access and processing ground station has one or more electronic computers in order to determine a location of each radio terminal from the dated data packets with unencoded access or with encoded access, which are extracted from the dated digitized listening signal, and from an ephemerides of the satellite or satellites of the constellation by using a technique for measuring angle or angles of arrival by sequenced interferometry associated with a technique for measuring Doppler drift or drifts.

12. The locating and communication system for at least one radio terminal according to claim 11, wherein:

each of the one or more non-geostationary satellites describe an orbit included in the set of low Earth orbits LEO and medium Earth orbits MEO; and each satellite of the constellation moves at a speed of movement in relation to Earth having a predetermined modulus v and the time shift of two successive packets of the sequence is greater than or equal to a ratio of the wavelength λ of the radio-frequency carrier of the radio-frequency signal to twice the modulus v of the speed of movement of the satellite.

\* \* \* \* \*